(12) United States Patent
Kitatani

(10) Patent No.: US 9,282,306 B2
(45) Date of Patent: Mar. 8, 2016

(54) IMAGING DEVICE, INFORMATION PROCESSING DEVICE, AND NON-TRANSITORY COMPUTER READABLE MEDIUM STORING PROGRAM

(75) Inventor: Kenichi Kitatani, Kanagawa (JP)

(73) Assignee: NEC CORPORATION, Tokyo (JP)

( * ) Notice: Subject to any disclaimer, the term of this patent is extended or adjusted under 35 U.S.C. 154(b) by 223 days.

(21) Appl. No.: 13/983,898

(22) PCT Filed: Feb. 22, 2012

(86) PCT No.: PCT/JP2012/001216
§ 371 (c)(1),
(2), (4) Date: Aug. 6, 2013

(87) PCT Pub. No.: WO2012/124262
PCT Pub. Date: Sep. 20, 2012

(65) Prior Publication Data
US 2013/0343728 A1 Dec. 26, 2013

(30) Foreign Application Priority Data
Mar. 15, 2011 (JP) .................. 2011-056244

(51) Int. Cl.
*H04N 5/72* (2006.01)
*H04N 9/79* (2006.01)
*H04N 5/232* (2006.01)
*H04N 5/77* (2006.01)

(52) U.S. Cl.
CPC ............ *H04N 9/79* (2013.01); *H04N 5/23258* (2013.01); *H04N 5/23264* (2013.01); *H04N 5/772* (2013.01); *H04N 5/23222* (2013.01)

(58) Field of Classification Search
None
See application file for complete search history.

(56) References Cited

U.S. PATENT DOCUMENTS

| 5,502,484 A | 3/1996 | Okada |
| 2003/0215010 A1 | 11/2003 | Kashiwa |
| 2007/0147814 A1 | 6/2007 | Nomura et al. |
| 2009/0284609 A1* | 11/2009 | Matsunaga .............. 348/208.12 |
| 2011/0129206 A1* | 6/2011 | Muramatsu ................... 396/55 |

FOREIGN PATENT DOCUMENTS

| JP | 6-245136 | 9/1994 |
| JP | 2002-033949 | 1/2002 |
| JP | 2003-274360 | 9/2003 |
| JP | 2007-174218 | 7/2007 |

(Continued)

OTHER PUBLICATIONS

Supplementary European Search Report dated Aug. 22, 2014 in corresponding European Patent Application No. 12757264.

(Continued)

*Primary Examiner* — William C Vaughn, Jr.
*Assistant Examiner* — Eileen Adams
(74) *Attorney, Agent, or Firm* — Young & Thompson

(57) ABSTRACT

It is desired to obtain a more valuable picture from the viewpoint of a person seeing the picture. An imaging device (100) includes an imaging unit (40), a position/posture detection unit (60) that detects a spatial displacement, and a data processing unit (50) that processes image data supplied from the imaging unit (40) in a format in accordance with the displacement detected by the position/posture detection unit (60). The imaging device (100) is built in a mobile phone or the like, for example. A lens unit (30) is often disposed on an imager included in the imaging unit (40).

21 Claims, 11 Drawing Sheets

(56) References Cited

FOREIGN PATENT DOCUMENTS

| JP | 2007-189384 | 7/2007 |
| JP | 2008-206099 | 9/2008 |
| JP | 2008-235969 | 10/2008 |
| JP | 2008-270983 | 11/2008 |
| JP | 2010-154302 | 7/2010 |
| JP | 2010-283432 | 12/2010 |

OTHER PUBLICATIONS

International Search Report, PCT/JP2012/001216, Jun. 5, 2012.
JP Office Action, dated Sep. 1, 2015; Application No. 2013-504536.

* cited by examiner

IMAGING DEVICE, INFORMATION PROCESSING DEVICE, AND NON-TRANSITORY COMPUTER READABLE MEDIUM STORING PROGRAM

TECHNICAL FIELD

The present invention relates to an imaging device, an information processing device, and a non-transitory computer readable medium storing program.

BACKGROUND ART

With the proliferation of small electronic equipment with video shooting features (for example, smartphones, video cameras etc.), videos are shot in a variety of environments. Because a video camera sometimes wobbles at the time of video shooting, various measures are proposed to compensate the displacement. For example, measures such as incorporating an optical unit for displacement compensation into a device, compensating the displacement by image processing and the like are proposed.

Patent Literature 1 discloses a technique to easily create a digest picture and increase the efficiency of editing in an information processing device. Specifically, a cut signal is generated corresponding to event data, and moving images for a specified period are cut off. It is thereby possible to obtain effects such as cutting out the moving images at appropriate positions while shooting the moving images and sequentially create moving image files (for example, see the paragraph 0046 in Patent Literature 1).

Patent Literature 2 discloses an electronic camera that performs frame alignment accurately, avoiding a subject from being out of the frame. Specifically, the moving speed is calculated from the movement of an image of interest, and, in accordance with the speed of the image of interest, the zoom size (imaging area) is enlarged when the movement of the image of interest is large, and the zoom size is reduced when it is small.

CITATION LIST

Patent Literature

PTL1: Japanese Unexamined Patent Application Publication No. 2010-154302
PTL2: Japanese Unexamined Patent Application Publication No. 2002-33949

SUMMARY OF INVENTION

Technical Problem

Although videos are shot in a variety of environments as described above, a picture that is not important for a person seeing the video is obtained in often cases due to the movement of a person shooting the video or the like. For example, there is a case where a picture that is hard to see at the time of playback is obtained due to the frequent/rapid movement of the imaging device. Further, there is a case where a totally unwanted picture (for example, a picture of the ground surface) is obtained due to forgetting to stop the recording mode by a person shooting a video. Those specific examples are described by way of illustration only, and thus are not to be considered as limiting the present invention.

As is obvious from the above description, it is strongly desired to obtain a more valuable picture from the viewpoint of a person seeing the picture.

Solution to Problem

An imaging device according to one exemplary aspect of the invention includes imaging means, displacement detection means for detecting a spatial displacement and image data processing means for processing image data supplied from the imaging means in a format in accordance with the displacement detected by the displacement detection means.

An information processing device according to one exemplary aspect of the invention processes image data supplied from an imaging means in a format in accordance with a displacement detected by a displacement detection means for detecting a spatial displacement.

An operation method for an imaging device according to one exemplary aspect of the invention includes generating image data by imaging means, detecting a spatial displacement by displacement detection means, and processing the image data supplied from the imaging means by image data processing means in a format in accordance with the displacement detected by the displacement detection means. A program according to one exemplary aspect of the invention causes a computer to execute the above process.

Advantageous Effects of Invention

According to the present invention, it is possible to obtain a more valuable picture from the viewpoint of a person seeing the picture.

DESCRIPTION OF EMBODIMENTS

The exemplary embodiments described hereinbelow are not independent of one another but can be combined with one another and multiplier effects on the basis of such a combination are also comprehended. The same elements will be denoted by the same reference symbols and redundant description/redundant illustration between the respective exemplary embodiments will be omitted as appropriate.

First Exemplary Embodiment

Exemplary embodiments of the invention are described hereinafter with reference to the drawings. An information processing device according to this exemplary embodiment processes image data supplied from an imaging unit in the way corresponding to a displacement detected by a displacement detection unit that detects a spatial displacement (which includes a sensing device such as an acceleration sensor or an angular velocity sensor, for example). It is thereby possible to obtain a more valuable picture from the viewpoint of a person seeing the picture. This will be apparent from the following detailed description.

Figure 1:
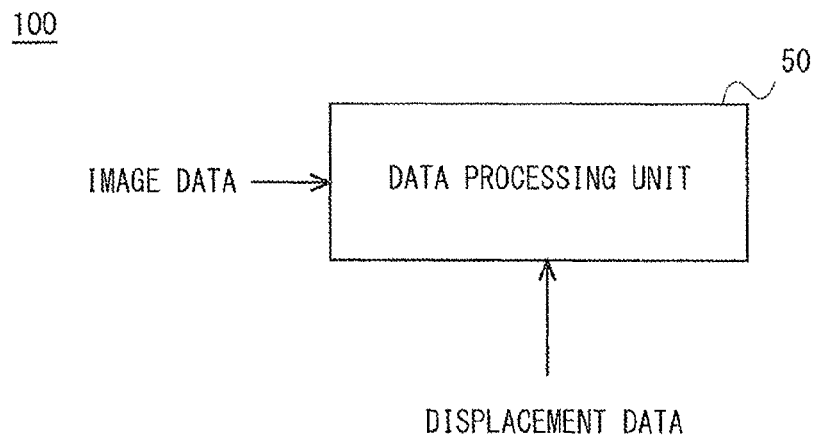
FIG. 1 is a schematic block diagram of an information processing device according to a first exemplary embodiment.

As shown in FIG. 1, an information processing device 100 includes a data processing unit (image data processing means, image data processing unit) 50. Image data and displacement data are input to the data processing unit 50. The data processing unit 50 is implemented by a functional circuit, execution of a program by a CPU or the like. Note that the image data is supplied from an imaging unit, which is not shown, to the data processing unit 50. The displacement data is supplied from a displacement detection unit, which is not shown, to the data processing unit 50.

The information processing device 100 operates as follows. It is assumed that the imaging unit performs sequential shooting of a subject and outputs the image data, and the displacement detection unit detects its own movement and outputs the displacement data. It is also assumed that the displacement detection unit detects a change in the imaging area that is imaged by the imaging unit. When the imaging unit and the displacement detection unit are incorporated into one housing, the displacement detection unit detects a displacement of the imaging unit (a change in imaging area/imaging target) by sensing of its own displacement.

The data processing unit 50 changes processing on the image data in accordance with the displacement data. For example, the data processing unit 50 processes the image data so as to reduce the possibility to acquire a picture that is hard to see at the time of playback in accordance with the displacement data. To be more specific, it executes image deletion and image delay display processing. It is thereby possible to obtain a more valuable picture from the viewpoint of a person seeing the picture.

As is obvious from the above exemplary explanation, with the structure disclosed in the exemplary embodiments, it is possible to obtain a more valuable picture from the viewpoint of a person seeing the picture.

Second Exemplary Embodiment

A second exemplary embodiment is described hereinafter with reference to FIGS. 2 to 5. This exemplary embodiment is different from the above-described exemplary embodiment in that the information processing device 100 functions as an imaging device 100 and further includes a lens unit (optical system) 30, an imaging unit (imaging means) 40, and a position/posture detection unit (displacement detection means, position/posture detection means) 60. In this case also, the same advantageous effects as described in the above exemplary embodiment can be obtained. Note that the number and structure of the lens unit 30, the structure of the imaging unit 40, and the structure of the position/posture detection unit 60 are not particularly limited.

Figure 2:
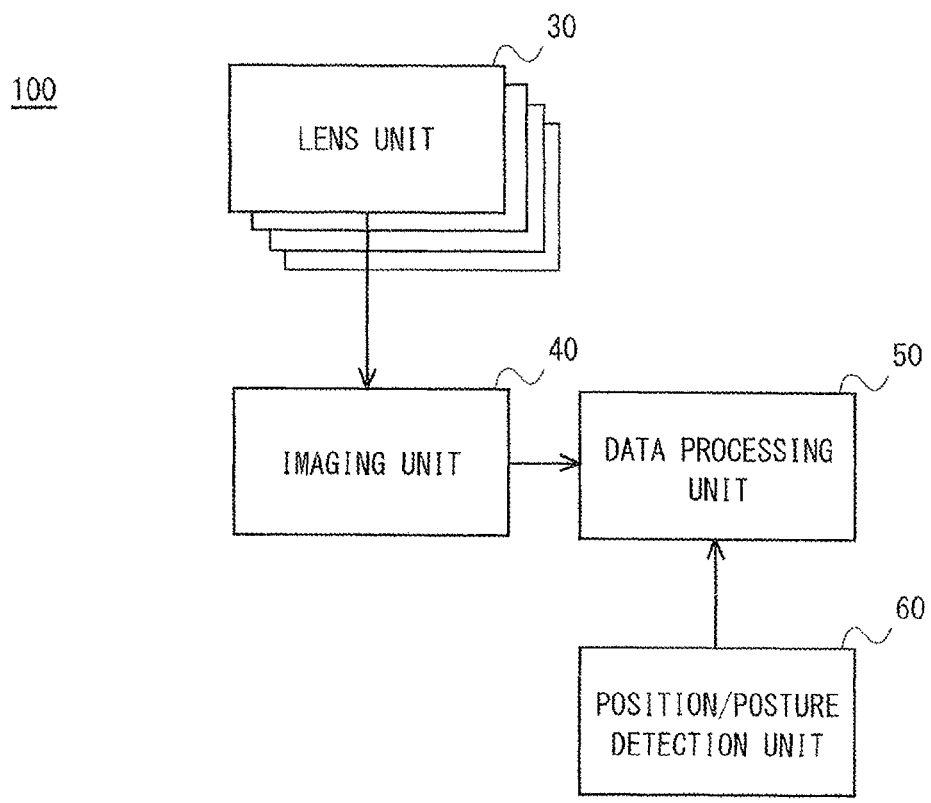
FIG. 2 is a schematic block diagram of an information processing device according to a second exemplary embodiment.

As is schematically shown in FIG. 2, a plurality of lens units may be prepared. One lens unit 30 may be composed of a plurality of lenses to form a zoom lens system. The imaging unit 40 may use a CCD (Charge Coupled Device Image Sensor) imager, a CMOS (Complementary Metal Oxide Semiconductor) imager or the like as an image acquisition means. The position/posture detection unit 60 preferably includes an acceleration/angular velocity sensor, a gyro sensor and the like produced by using MEMS (Micro Electro Mechanical Systems) or the like.

As is schematically shown in FIG. 2, a subject image is formed on the imaging region of the imaging unit 40 through the lens unit 30. The imaging unit 40 acquires images in succession, performs various kinds of processing such as level correction, A/D (Analog/Digital) conversion and data compression, and then supplies image data to the data processing unit 50. The position/posture detection unit 60 includes at least one of an acceleration sensor and an angular acceleration sensor and detects its own displacement and thereby detects the displacement of the lens unit 30/the imaging unit 40/the imaging device 100. The data processing unit 50 changes the data processing mode in accordance with the detection result of the position/posture detection unit 60.

Figure 3:
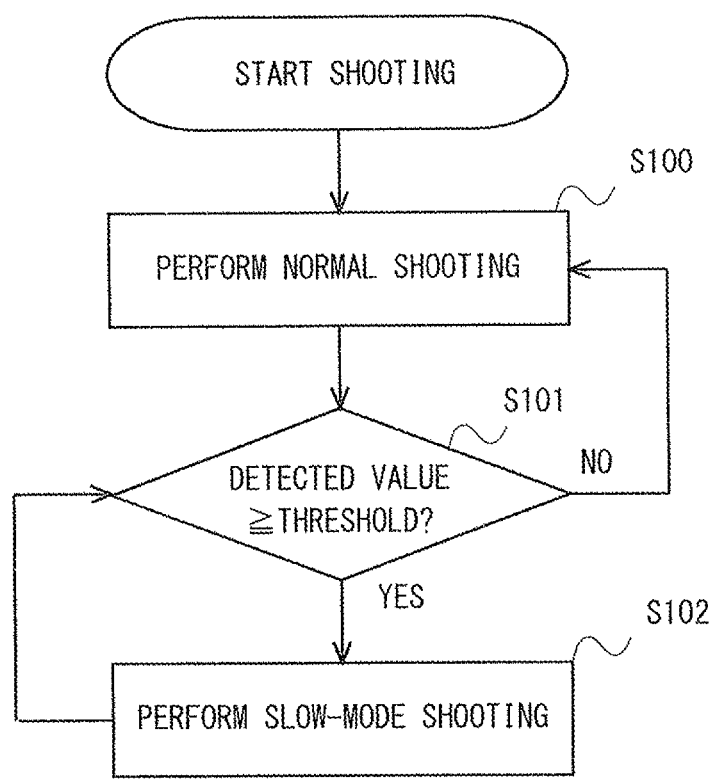
FIG. 3 is a schematic flowchart showing an operation of the information processing device according to the second exemplary embodiment.

The operation of the imaging device 100 is described with reference to FIG. 3. First, in response to the press of a recording start button or the like by a person shooting a video, the imaging device 100 starts normal shooting (S100). Specifically, the imaging unit 40 performs sequential shooting of a subject through the lens unit 30, performs various kinds of processing on the generated image signal, and outputs the image data. The data processing unit 50 writes the image data supplied from the imaging unit 40 into a storage device included therein. In this manner, the image data is accumulated sequentially. Preferably, audio data is also acquired and stored into the same container as the image data.

Next, when the imaging device 100 is displaced rapidly in a given direction, the detected value of the position/posture detection unit 60 becomes equal to or higher than a threshold (S101). Specifically, the output value of the acceleration sensor or the angular acceleration sensor in the position/posture detection unit 60 becomes equal to or higher than a threshold. The data processing unit 50 receives the detected value of the position/posture detection unit 60 and compares it with the threshold. When the detected value is equal to or higher than the threshold, the data processing unit 50 performs data processing to implement slow-mode shooting. Note that the value to be used for the comparison by the data processing unit 50 may be the integral value of acceleration (speed, position) or the integral value of angular acceleration (angular velocity, angle). An angular change may be calculated from acceleration. The threshold may be prestored in a resistor or the like in the data processing unit 50. The threshold may be supplied from the outside to the data processing unit 50.

When the detected value is equal to or higher than the threshold, the imaging device 100 starts slow-mode shooting (S102). In other words, the shooting mode of the imaging device 100 is changed. In this example, a change of the shooting mode of the imaging device 100 is made by a change of the operation mode of the data processing unit 50. This is described hereinafter with reference to FIGS. 4 and 5. Note that, in FIGS. 4 and 5, "before change" indicates the state before the shooting direction is changed, and "after change" indicates the state after the shooting direction is changed. In the process from "before change" to "after change" (the acquisition period of images 1 to 6), the shooting direction of the imaging device 100 changes rapidly.

Figure 4:
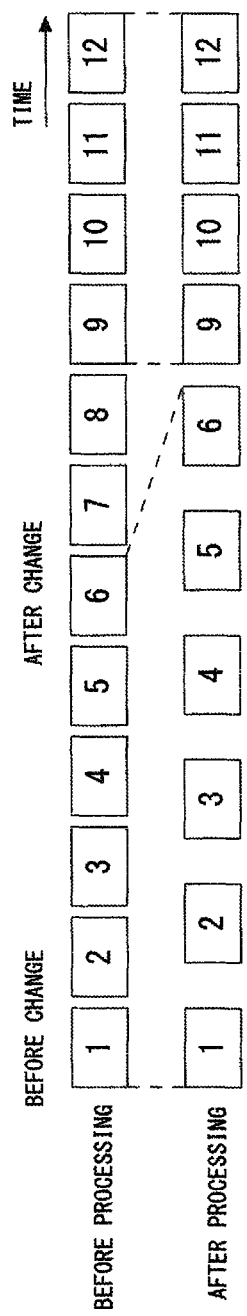
FIG. 4 is an explanatory diagram showing an operation of the information processing device according to the second exemplary embodiment.

As is schematically shown in FIG. 4, it is assumed that unprocessed images 1 to 12 are stored sequentially in time. As is obvious from the comparison of before and after processing of the images 1 to 6, during the slow-mode shooting, the data processing unit 50 processes the image data in such a way that an image to be played back at a specified point of time is played back at the delayed timing. It is thereby possible to effectively avoid that a picture acquired during the period of displacement of the lens unit 30/the imaging unit 40/the imaging device 100 is reproduced as a picture that is hard to see in which a subject moves at high speed within the frame.

Note that, in the case of FIG. 4, images 7 and 8 are discarded by the processing to delay the display timing of the images 2 to 6. Specifically, the data processing unit 50 performs processing on the input image data so as to delay the images 2 to 6 and delete the images 7 and 8. Note that the way and the timing the data processing unit 50 writes the image data into a storage device are arbitrary. For example, the data processing unit 50 stores the image data in association with time, stores the images 2 to 6 in association with delayed time and discards the images 7 and 8 without writing them into the storage device. Note that, after the image 9, the mode returns to the normal shooting mode.

Figure 5:
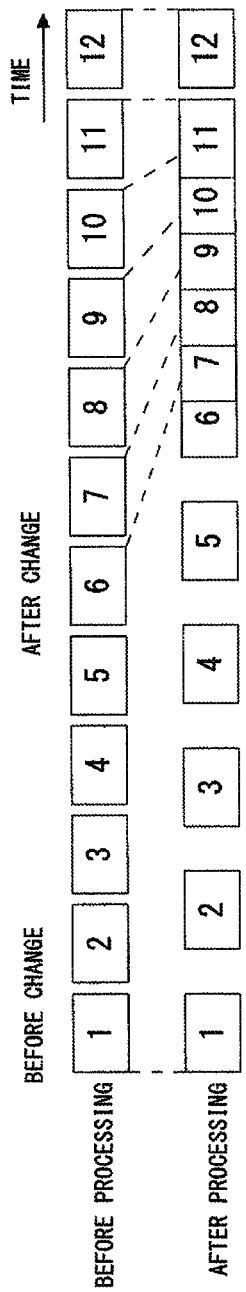
FIG. 5 is an explanatory diagram showing an operation of the information processing device according to the second exemplary embodiment.

As shown in FIG. 5, it is feasible to delay the display timing of the images 2 to 6 and shorten the display interval of the images 7 to 10. Specifically, the data processing unit 50 performs processing on the input image data so as to delay the images 2 to 6 and shorten the display interval of the images 7 to 10. Note that the way and the timing the data processing unit 50 writes the image data into a storage device are arbitrary. For example, the data processing unit 50 stores the image data in association with time, stores the images 2 to 6 in association with delayed time and stores the images 7 to 10 in association with delayed time at a shorter time interval. In this case, the original images 7 to 10 are not discarded, thus enhancing the reliability of the video. Note that, after the image 12, the mode returns to the normal shooting mode.

In this exemplary embodiment, the image data is processed in such a way that an image to be played back at a specified point of time is played back at the delayed timing after detection of the rapid displacement of the lens unit 30/the imaging unit 40/the imaging device 100. It is thereby possible to effectively avoid that a picture acquired during the period of displacement of the lens unit 30/the imaging unit 40/the imaging device 100 is reproduced as a picture that is hard to see in which a subject moves at high speed within the frame, and consequently, it is possible to obtain a more valuable picture from the viewpoint of a person seeing the picture.

Third Exemplary Embodiment

Figure 6:
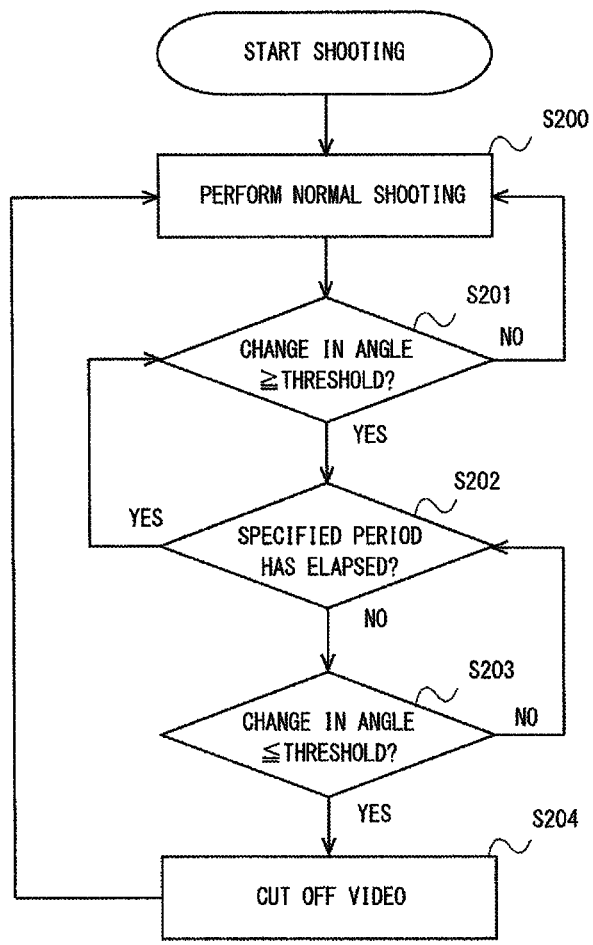
FIG. 6 is a schematic flowchart showing an operation of an information processing device according to a third exemplary embodiment.

A third exemplary embodiment is described hereinafter with reference to FIG. 6. This exemplary embodiment is different from the above-described exemplary embodiment in that the data processing unit 50 detects a specified state based on the output of the position/posture detection unit 60 and deletes images acquired during the period of the specified state without storing them. It is thereby possible to obtain a more valuable picture from the viewpoint of a person seeing the picture.

The operation of the imaging device 100 according to this exemplary embodiment is described hereinafter with reference to FIG. 6. First, the imaging device 100 performs normal shooting (S200). This is the same as in the case shown in FIG. 3.

Next, it is detected that the lens unit 30/the imaging unit 40/the imaging device 100 has turned to a specified direction temporarily and then turned back to the original state in a short period of time by the operation of Steps S201 to S203. In other words, it is detected that the imaging direction of the imaging unit 40 has turned to a specified direction and then turned back to the original direction in a short period of time.

When the imaging device 100 rotates rapidly in a given direction, a change of angle calculated from the detected value of the position/posture detection unit 60 becomes equal to or higher than a threshold (S201). Specifically, a change of angle calculated from the output value of the angular acceleration sensor in the position/posture detection unit 60 becomes equal to or higher than a threshold. The data processing unit 50 receives the detected value of the position/posture detection unit 60, performs integration of the detected value, and compares the integral value with the threshold. Note that the change of angle corresponding to the angle between the initial position and the current position. When the imaging device 100 is located in the initial position, the angle between the initial position and the current position is 0°. A method of detecting/calculating the change of angle is arbitrary, and preferably the current angle is calculated sequentially by the integration of angular accelerations detected one after another. In the case where the angle is calculated assuming that the specified direction is positive and the opposite direction is negative, the current angle with respect to the initial position, which is the change of angle, can be detected by simply adding the calculated values. An error to be added may be eliminated at appropriate timing. The initial position corresponds to the position at the startup of the imaging device 100, for example.

When the integral value becomes equal to or higher than the threshold, it is then determined whether a specified period of time has elapsed (S202). Specifically, the data processing unit 50 determines whether a specified period of time has elapsed or not by referring to a timer included therein, for example.

When the specified period of time has not elapsed, it is determined whether the change of angle has become equal to or lower than the threshold (S203). Specifically, the data processing unit 50 determines whether the change of angle calculated based on the output value of the angular acceleration sensor in the position/posture detection unit 60 is equal to or lower than the threshold.

When it is determined that the change of angle is equal to or lower than the threshold, a part of the video is cut off (S204). Specifically, the data processing unit 50 discards the images acquired during Steps S201 to S203 so that they are not played back as a video and do not write those images into the storage device. After S204, the mode returns to the normal shooting mode. It is thereby possible to remove the images that have been shot facing the wrong direction temporarily, and consequently, it is possible to obtain a more valuable picture from the viewpoint of a person seeing the picture.

Note that, when the specified period of time has elapsed in Step S202, it can be determined that it is likely to continue shooting at that angle. Thus, the operation is controlled not to proceed to Step S204. Further, the same applies to the case where the changed angle has not returned to its original angle before the specified period of time has elapsed. This exemplary embodiment may be applied to either one or both of the first and second exemplary embodiments.

Fourth Exemplary Embodiment

Figure 7:
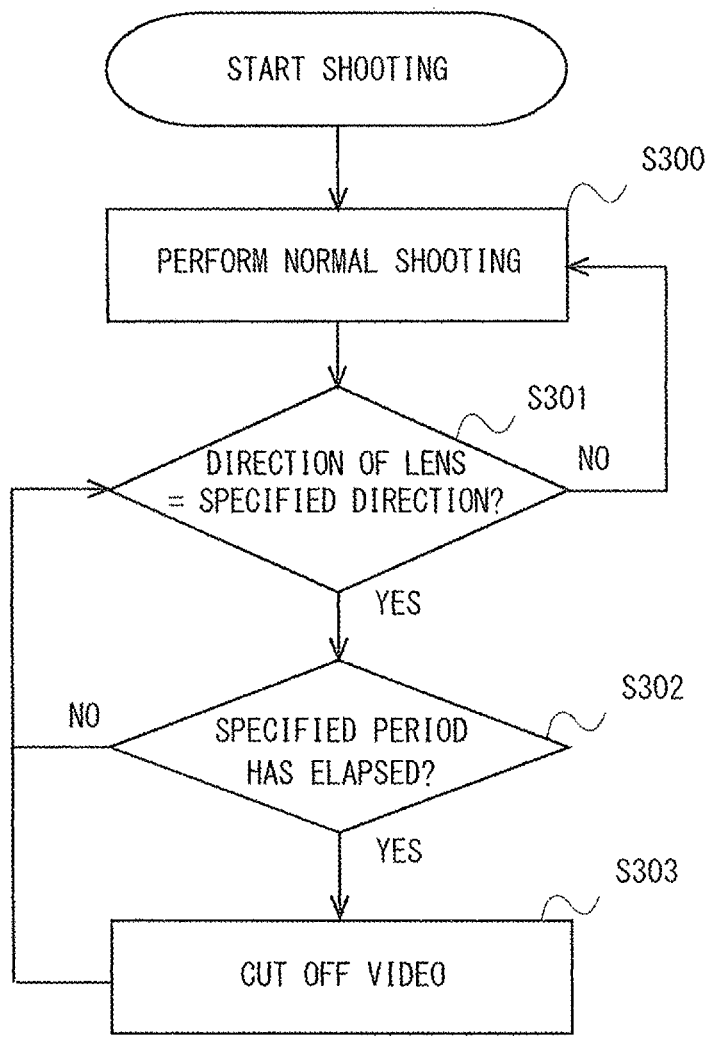
FIG. 7 is a schematic flowchart showing an operation of an information processing device according to a fourth exemplary embodiment.

A fourth exemplary embodiment is described hereinafter with reference to FIG. 7. This exemplary embodiment is different from the above-described exemplary embodiment in that the data processing unit 50 detects that the lens unit 30 is facing a specified direction based on the output of the position/posture detection unit 60 and deletes images acquired during the period of this state without storing them. It is thereby possible to obtain a more valuable picture from the viewpoint of a person seeing the picture.

The operation of the imaging device 100 according to this exemplary embodiment is described hereinafter with reference to FIG. 7. First, the imaging device 100 performs normal shooting (S300). This is the same as in the case shown in FIG. 3.

Next, the imaging device 100 detects whether the state where the lens unit 30 is facing a specified direction continues or not by the operation of Steps S301 and S302.

When the lens unit 30 of the imaging device 100 turns to a specified direction, it is determined whether the lens is facing a specified direction or not (S301). For example, the data processing unit 50 determines whether an angle calculated from the detected value of the position/posture detection unit 60 is within a specified angle range. Note that this angle can be considered to be the same as a change of angle described above, and it corresponds to the angle between the initial position and the current position, for example.

When it is determined that the lens is facing a specified direction, it is determined whether a specified period of time has elapsed (S302). Specifically, the data processing unit 50 determines whether a specified period of time has elapsed or not by referring to a timer included therein, for example.

When the specified period of time has elapsed (S303), the video is cut off (S303). Specifically, the data processing unit 50 discards the images acquired during Steps S301 to S302 so that they are not played back as a video and do not write those images into the storage device. After S303, the mode returns to standby mode for the detection of S301. Note that, during the standby mode, normal shooting in S300 is performed.

According to this exemplary embodiment, the data processing unit 50 detects that the lens unit 30 is facing a specified direction based on the output of the position/posture detection unit 60 and deletes images acquired during the period of this state without storing them. It is thereby possible to avoid that a totally unwanted picture (for example, a picture of the ground surface) is obtained due to forgetting to stop the recording mode by a person shooting a video, for example, and consequently, it is possible to obtain a more valuable picture from the viewpoint of a person seeing the picture.

Fifth Exemplary Embodiment

Figure 8:
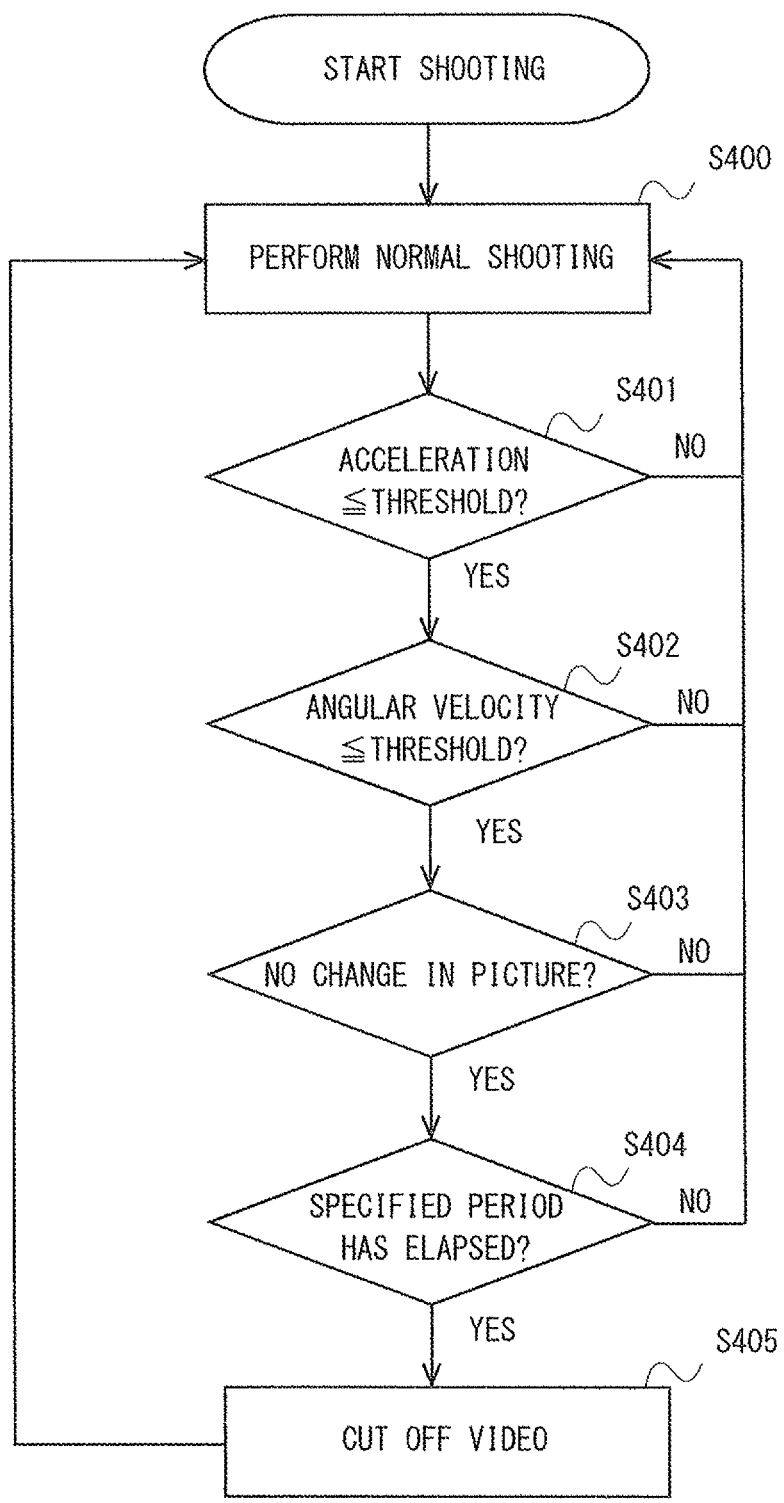
FIG. 8 is a schematic flowchart showing an operation of an information processing device according to a fifth exemplary embodiment.

A fifth exemplary embodiment is described hereinafter with reference to FIG. 8. This exemplary embodiment is different from the above-described exemplary embodiment in that the data processing unit 50 detects that a still picture where no change occurs in a subject is being acquired based on the output of the position/posture detection unit 60 or the output of the imaging unit 40 and deletes images acquired during this period without storing them. It is thereby possible to obtain a more valuable picture from the viewpoint of a person seeing the picture.

The operation of the imaging device 100 according to this exemplary embodiment is described hereinafter with reference to FIG. 8. First, the imaging device 100 performs normal shooting (S400). This is the same as in the case shown in FIG. 3.

Next, the imaging device 100 detects that a still picture where no change occurs in a subject is being acquired by the operation of Steps S401 and S404.

First, it is determined that the imaging device 100 is in a stationary state from the output of the position/posture detection unit 60. Specifically, the data processing unit 50 determines whether the acceleration is a threshold or less (S401), and the angular velocity is a threshold or less (S402). When the acceleration is a threshold or less and the angular velocity is a threshold or less, the data processing unit 50 detects that the imaging device 100 is in a stationary state.

Next, it is determined whether the state where no change occurs in pictures continues or not. Specifically, the data processing unit 50 determines whether there is a change in pictures (S403) and then determines whether a specified period of time has elapsed (S404). For example, the data processing unit 50 determines the continuity of pictures by evaluating a difference between frames that are input in succession. The data processing unit 50 may determine the continuity of pictures by focusing on a characteristic part in the frames. Whether a specified period of time has elapsed or not can be determined by referring to a timer included in the data processing unit 50.

When it is determined that the state where no change occurs in pictures continues, the video is cut off (S405). Specifically, the data processing unit 50 discards the images acquired during a specified period of time from when it is determined that no change occurs in pictures in Step S403 so that they are not played back as a video and do not write those images into the storage device. Note that, when the determination result is NO in Steps S401 to S404, the process returns to Step S400. As a result of repeating the loop of S401 to S404 for a specified period, Step of S405 is executed.

In this exemplary embodiment, the data processing unit 50 detects that a still picture where no change occurs in a subject is being acquired based on the output of the position/posture detection unit 60 or the output of the imaging unit 40 and deletes images acquired during this period without storing them. It is thereby possible to obtain a more valuable picture from the viewpoint of a person seeing the picture.

Sixth Exemplary Embodiment

Figure 10:
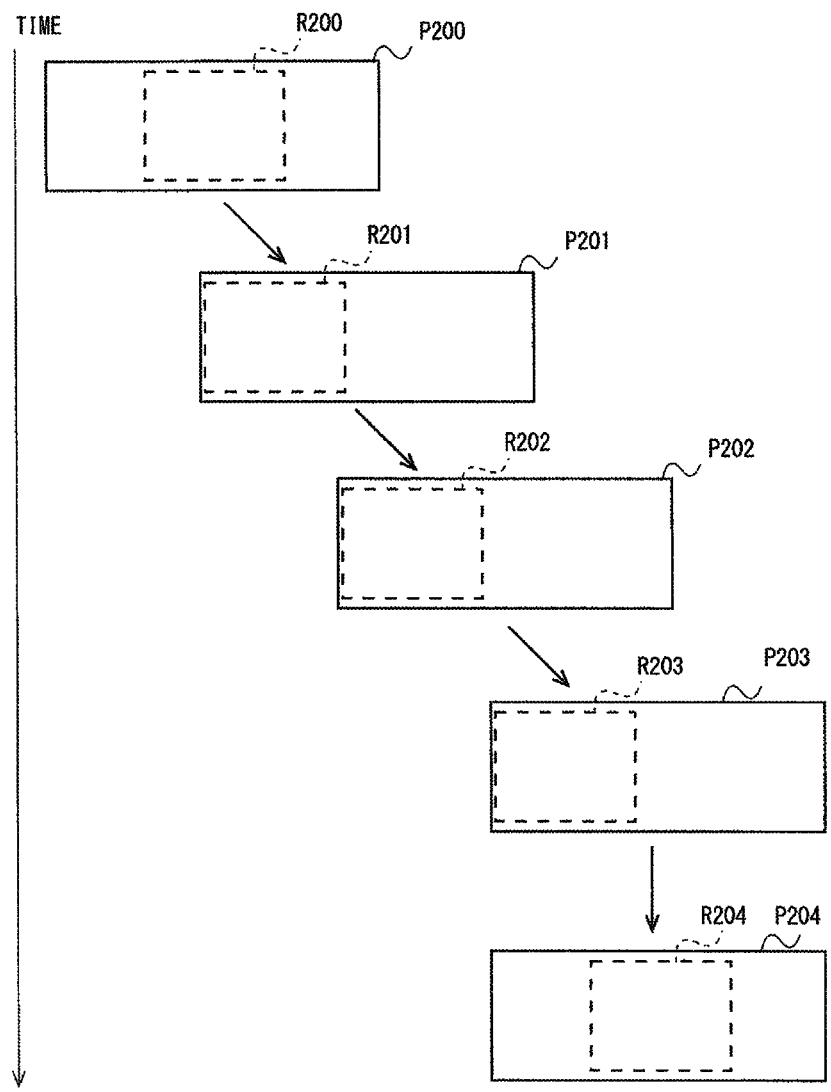
FIG. 10 is an explanatory diagram illustrating an operation of an information processing device according to a sixth exemplary embodiment.
Figure 11:
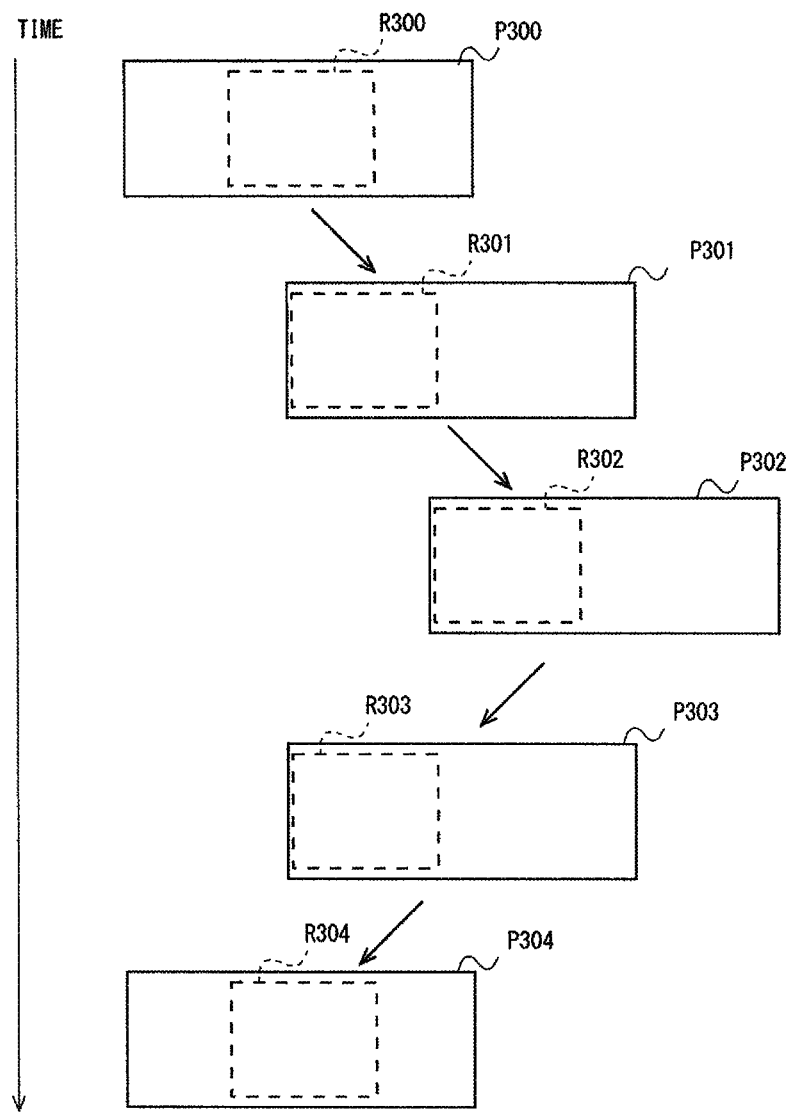
FIG. 11 is an explanatory diagram illustrating an operation of the information processing device according to the sixth exemplary embodiment.

A sixth exemplary embodiment is described hereinafter with reference to FIGS. 9 to 11. This exemplary embodiment is different from the above-described exemplary embodiment in that an imaging area P100 that is imaged by the lens unit 30 is larger than a stored area R100 that is extracted and stored by the data processing unit 50. In this case also, the same advantageous effects as those of the above-described exemplary embodiments can be obtained. In this exemplary embodiment, as shown in FIGS. 10 and 11, the stored area changes slowly with respect to the movement of the imaging area, as is obvious from the comparison with FIG. 9. This makes pictures easily seen, and it is thereby possible to obtain a more valuable picture from the viewpoint of a person seeing the picture.

Figure 9:
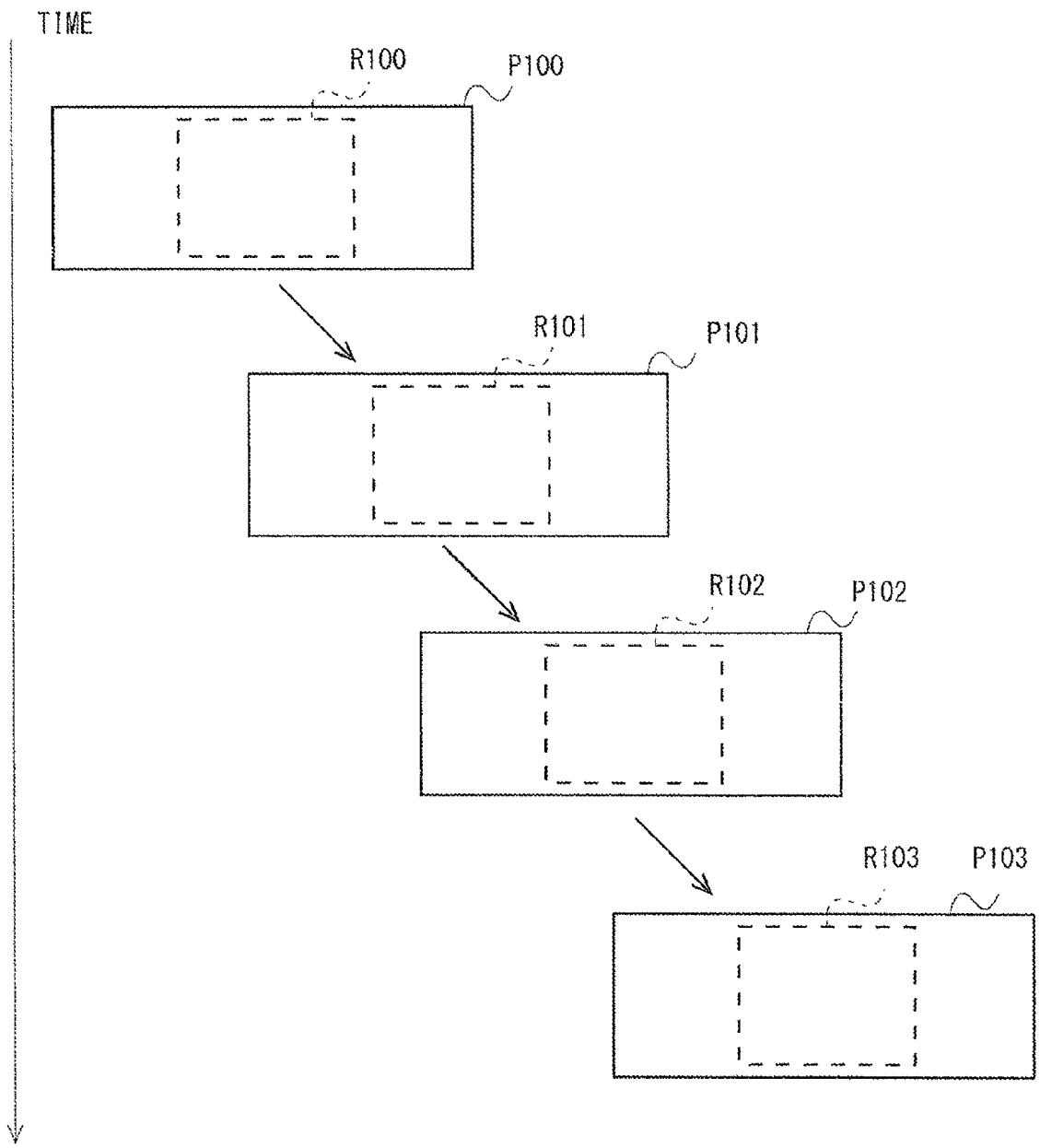
FIG. 9 is an explanatory diagram illustrating an operation of an information processing device according to a reference example.

In the case shown in FIG. 9, the imaging area moves, as the area P100, the area P101, the area P102 and the area P103, from left to right when viewed from the front. Further, the stored area is set near the center of the imaging area and moves in synchronization with the movement of the imaging area.

In this exemplary embodiment, the data processing unit 50 detects the moving direction and the moving speed of the imaging area based on the output of the position/posture detection unit 60 and changes the stored area within the imaging area in accordance with the detected results.

As shown in FIG. 10, when the imaging area transitions from the area P200 to the area P201, the data processing unit 50 changes the position of the stored area within the imaging area in the opposite direction. When the imaging area sequentially transitions from the area P201 to the area P203, the data processing unit 50 maintains this state. When the imaging area transitions from the area P203 to the area P204, the data processing unit 50 detects that the imaging area is not moving based on the output of the position/posture detection unit 60 and then changes the position of the stored area within the imaging area back to the initial position.

As shown in FIG. 11, when the imaging area transitions from the area P300 to the area P301, the data processing unit 50 changes the position of the stored area within the imaging area in the opposite direction. When the imaging area sequentially transitions from the area P301 to the area P303, the data processing unit 50 maintains this state. When the imaging area transitions from the area P303 to the area P304, the data processing unit 50 detects that the imaging area is back in the original direction based on the output of the position/posture detection unit 60 and then changes the position of the stored area within the imaging area back to the initial position.

Although a specific structure of the position/posture detection unit 60 is not particularly limited, it is preferred that it can detect the acceleration in three axis directions. It is thereby possible to detect a displacement in any directions and make a change to the stored area within the imaging area more accurately.

Seventh Exemplary Embodiment

Figure 12:
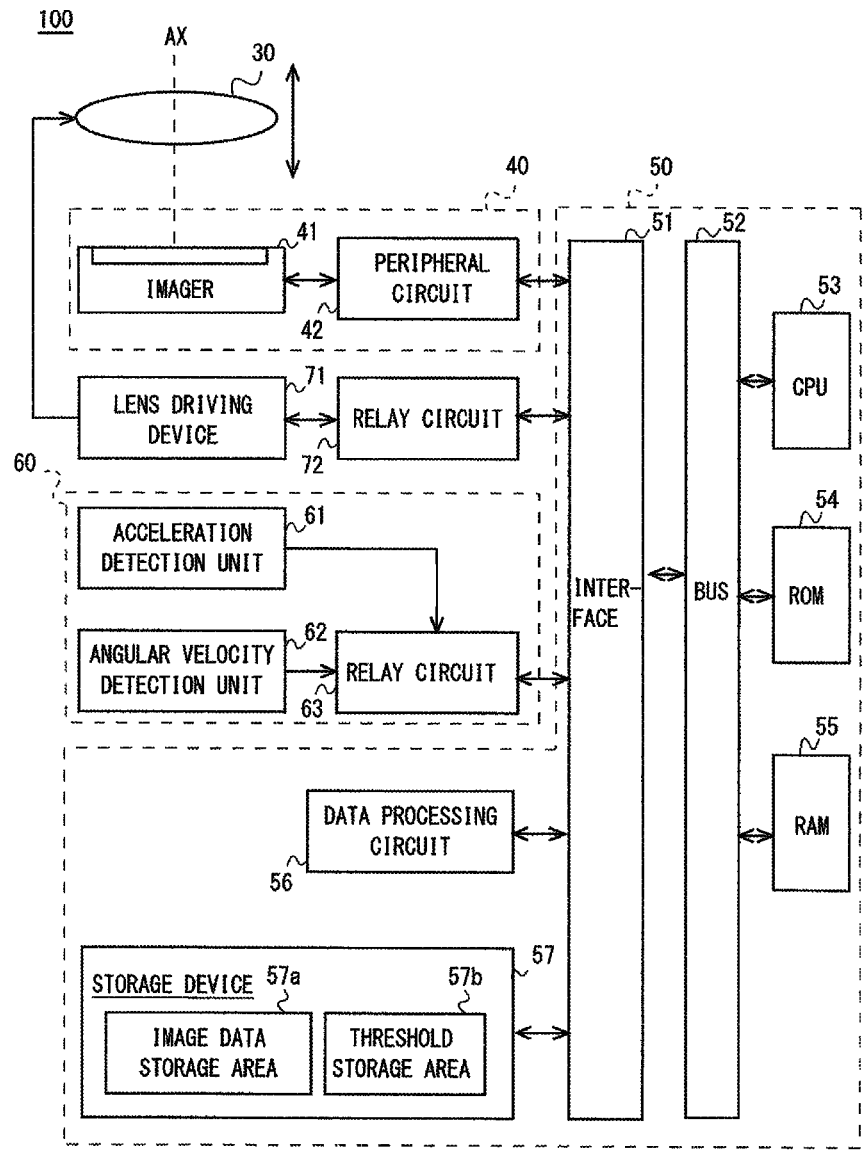
FIG. 12 is a schematic block diagram of an information processing device according to a seventh exemplary embodiment.

A seventh exemplary embodiment is described hereinafter with reference to FIG. 12. FIG. 12 shows the details of the block diagram shown in FIG. 2 by way of illustration. A specific structure of the block structure shown in FIG. 2 is not particularly limited.

As shown in FIG. 12, the information processing device 100 includes a lens unit 30, an imager (imaging element) 41, a peripheral circuit 42, an interface 51, a bus 52, a CPU (Central Processing Unit) 53, a ROM (Read Only Memory) 54, a RAM (Random Access Memory) 55, a data processing circuit 56, a storage device 57, an acceleration detection unit 61, an angular velocity detection unit 62, a relay circuit 63, a lens driving device 71, and a relay circuit 72.

The imaging unit 40 is composed of the imager 41 and the peripheral circuit 42, for example. The data processing unit 50 is composed of the interface 51, the bus 52, the CPU 53, the ROM 54, the RAM 55, the data processing circuit 56 and the storage device 57, for example. The position/posture detection unit 60 is composed of the acceleration detection unit 61, the angular velocity detection unit 62 and the relay circuit 63, for example.

The imager 41 is a typical semiconductor imaging device such as a CCD sensor or a CMOS sensor, and has an imaging region where pixels are arranged in a matrix on its front surface. The imager 41 images a subject through the lens unit 30. The peripheral circuit 42 supplies various control signals to the imager 41, and performs various kinds of processing (for example, A/D conversion, digital signal correction, data compression etc.) on the image signal supplied from the imager 41.

The interface 51, the bus 52, the CPU 53, the ROM 54 and the RAM 55 constitute the basis of a computer. The CPU 53 executes a program stored in the storage device 57 (ROM 54, RAM 55) and implements various functions. The flowcharts described in the above exemplary embodiments are implemented by executing a program by the CPU 53. The threshold shown in the above-described flowcharts may be stored in the ROM 54 or the RAM 55. A place to store the threshold is arbitrary, and it may be stored in a threshold storage area 57b in the storage device 57 in the case shown in FIG. 12. The bus 52 is a transmission line for data, various control signals and various values. The interface 51 is a functional part to control a connection between the bus 51 and an external circuit.

The data processing circuit 56 is a functional circuit that processes the image data supplied from the peripheral circuit 42 through the bus 52. For example, the data processing circuit 56 processes the original image data so that the reproduced images as shown in FIG. 4 can be obtained. Further, the data processing circuit 56 processes the original image data so that the reproduced images as shown in FIG. 5 can be obtained.

Note that a specific operation method of the data processing circuit 56 is not particularly limited. For example, when the image data is supplied in association with time, the data processing circuit 56 adds a specified length of time to the time associated with the image data. The image is thereby played back at the delayed timing. In the case shown in FIG. 4, there are images (images 7 and 8) that cannot be played back and displayed by this delay processing. To deal with this point, the data processing circuit 56 performs processing to delete the images 7 and 8. In this manner, the original image data is processed and then stored into an image data storage area 57a of the storage device 57 through the bus 52.

In the case shown in FIG. 5, there are images (images 7 and 8) that cannot be played back and displayed by the above delay processing. To deal with this point, the data processing circuit 56 processes the original image data so that the images 7 to 10 are played back at a shorter time interval than normal display time. In this manner, the original image data is processed and then stored into the image data storage area 57a of the storage device 57 through the bus 52. Note that, although data transfer control or the like is executed as appropriate by the CPU 53, it is not limited thereto, and such control may be executed by a timing controller circuit.

The invention is not limited to these exemplary embodiments, and it will be understood by those of ordinary skill in the art that various changes in form and details may be made therein without departing from the spirit and scope of the present invention. For example, specific structures of the data processing unit and the displacement detection unit are arbitrary. Further, a specific structure of the image data is arbitrary.

The whole or part of the exemplary embodiments disclosed above can be described as, but not limited to, the following supplementary notes.

(Supplementary Note 1)

An imaging device comprising:
imaging means;
displacement detection means for detecting a spatial displacement; and
image data processing means for processing image data supplied from the imaging means in a format in accordance with the displacement detected by the displacement detection means.

(Supplementary Note 2)

The imaging device according to Supplementary note 1, wherein the image data processing means detects that a displacement speed or a displacement angular velocity detected by the displacement detection means is relatively high based on comparison of an output of the displacement detection means with a threshold, and changes processing on the image data in accordance with the detection.

(Supplementary Note 3)

The imaging device according to Supplementary note 1 or 2, wherein the image data processing means detects that a displacement speed or a displacement angular velocity detected by the displacement detection means is relatively high based on comparison of an output of the displacement detection means with a threshold, and processes the image data so that images acquired after the detection are displayed at timing delayed from actual time or so that at least some of images acquired after the detection are eliminated.

(Supplementary Note 4)

The imaging device according to any one of Supplementary notes 1 to 3, wherein the image data processing means detects that a displacement or a rotation angle detected by the displacement detection means is equal to or greater than a specified angle based on comparison of an output of the displacement detection means with a threshold, and processes the image data so that at least some of images acquired during a period when the displacement detected by the displacement detection means is equal to or greater than the specified angle are eliminated.

(Supplementary Note 5)

The imaging device according to any one of Supplementary notes 1 to 4, wherein the image data processing means detects that an imaging direction of the imaging means is a specified direction from the displacement detected by the displacement detection means, and processes the image data so that at least some of images acquired during a period when the imaging direction of the imaging unit is the specified direction are eliminated.

(Supplementary Note 6)

The imaging device according to any one of Supplementary notes 1 to 5, wherein, when the image data processing means detects that the imaging device is in a stationary state based on an output of the displacement detection means and detects that no change occurs in a subject based on the image data supplied from the imaging means, the image data processing means processes the image data so that at least some of images acquired by the imaging means during this state are eliminated.

(Supplementary Note 7)

The imaging device according to any one of Supplementary notes 1 to 6, wherein the image data processing means extracts a specified area of an image imaged by the imaging means, and the image data processing means processes the image data so that the same area of image is played back even when an imaging direction changes in a specified direction.

(Supplementary Note 8)

The imaging device according to any one of Supplementary notes 1 to 7, wherein the image data processing means extracts a specified area of an image imaged by the imaging means, and when an imaging direction changes in a specified direction, the image data processing means changes the specified area in a direction opposite to the specified direction.

(Supplementary Note 9)

The imaging device according to any one of Supplementary notes 1 to 8, wherein the image data processing means extracts a specified area of an image imaged by the imaging means, and when the specified area is located at an edge of the image imaged by the imaging means, the image data processing means changes the specified area upon end of a change in an imaging direction.

(Supplementary Note 10)

An information processing device that processes image data supplied from an imaging means in a format in accordance with a displacement detected by a displacement detection means for detecting a spatial displacement.

(Supplementary Note 11)

An operation method for an imaging device comprising:

generating imaging image data by imaging means;

detecting a spatial displacement by displacement detection means; and processing the image data supplied from the imaging means by image data processing means in a format in accordance with the displacement detected by the displacement detection means.

(Supplementary Note 12)

A program causing a computer to execute the process according to Supplementary note 11.

While the invention has been particularly shown and described with reference to exemplary embodiments thereof, the invention is not limited to these exemplary embodiments. It will be understood by those of ordinary skill in the art that various changes in form and details may be made therein without departing from the spirit and scope of the present invention as defined by the claims.

Although the present invention is described as a hardware configuration in the above exemplary embodiments, the present invention is not limited thereto. The present invention may be implemented by causing a CPU (Central Processing Unit) to execute a computer program to perform a given process.

The above-described program can be stored and provided to the computer using any type of non-transitory computer readable medium. The non-transitory computer readable medium includes any type of tangible storage medium. Examples of the non-transitory computer readable medium include magnetic storage media (such as floppy disks, magnetic tapes, hard disk drives, etc.), optical magnetic storage media (e.g. magneto-optical disks), CD-ROM (Read Only Memory), CD-R, CD-R/W, and semiconductor memories (such as mask ROM, PROM (Programmable ROM), EPROM (Erasable PROM), flash ROM, RAM (Random Access Memory), etc.). The program may be provided to a computer using any type of transitory computer readable medium. Examples of the transitory computer readable medium include electric signals, optical signals, and electromagnetic waves. The transitory computer readable medium can provide the program to a computer via a wired communication line such as an electric wire or optical fiber or a wireless communication line.

This application is based upon and claims the benefit of priority from Japanese patent application No. 2011-056244, filed on Mar. 15, 2011, the disclosure of which is incorporated herein in its entirety by reference.

REFERENCE SIGNS LIST

100 INFORMATION PROCESSING DEVICE
30 LENS UNIT
40 IMAGING UNIT
50 DATA PROCESSING UNIT
60 POSITION/POSTURE DETECTION UNIT

The invention claimed is:

1. An imaging device comprising:
   an imaging unit;
   a displacement detection unit configured to detect a spatial displacement; and
   an image data processing unit configured to process image data supplied from the imaging unit in a format in accordance with the displacement detected by the displacement detection unit,
   wherein the image data processing unit detects that a displacement or a rotation angle detected by the displacement detection unit is equal to or greater than a specified angle based on comparison of an output of the displacement detection unit with a threshold, and processes the image data so that at least some of images acquired during a period when the displacement detected by the displacement detection unit is equal to or greater than the specified angle are eliminated.

2. The imaging device according to claim 1, wherein the image data processing unit detects that a displacement speed or a displacement angular velocity detected by the displacement detection unit is relatively high based on comparison of an output of the displacement detection unit with a threshold, and changes processing on the image data in accordance with the detection.

3. The imaging device according to claim 2, wherein the image data processing unit detects that a displacement speed or a displacement angular velocity detected by the displacement detection unit is relatively high based on comparison of an output of the displacement detection unit with a threshold, and processes the image data so that images acquired after the detection are displayed at timing delayed from actual time or so that at least some of images acquired after the detection are eliminated.

4. The imaging device according to claim 2, wherein the image data processing unit detects that an imaging direction of the imaging unit is a specified direction from the displacement detected by the displacement detection unit, and processes the image data so that at least some of images acquired during a period when the imaging direction of the imaging unit is the specified direction are eliminated.

5. The imaging device according to claim 2, wherein, when the image data processing unit detects that the imaging device is in a stationary state based on an output of the displacement detection unit and detects that no change occurs in a subject based on the image data supplied from the imaging unit, the image data processing unit processes the image data so that at least some of images acquired by the imaging unit during this state are eliminated.

6. The imaging device according to claim 1, wherein the image data processing unit detects that a displacement speed or a displacement angular velocity detected by the displacement detection unit is relatively high based on comparison of an output of the displacement detection unit with a threshold, and processes the image data so that images acquired after the detection are displayed at timing delayed from actual time or so that at least some of images acquired after the detection are eliminated.

7. The imaging device according to claim 6, wherein the image data processing unit detects that an imaging direction of the imaging unit is a specified direction from the displacement detected by the displacement detection unit, and processes the image data so that at least some of images acquired during a period when the imaging direction of the imaging unit is the specified direction are eliminated.

8. The imaging device according to claim 1, wherein the image data processing unit detects that an imaging direction of the imaging unit is a specified direction from the displacement detected by the displacement detection unit, and processes the image data so that at least some of images acquired during a period when the imaging direction of the imaging unit is the specified direction are eliminated.

9. The imaging device according to claim 1, wherein, when the image data processing unit detects that the imaging device is in a stationary state based on an output of the displacement detection unit and detects that no change occurs in a subject based on the image data supplied from the imaging unit, the image data processing unit processes the image data so that at least some of images acquired by the imaging unit during this state are eliminated.

10. The imaging device according to claim 1, wherein,
    the image data processing unit extracts a specified area of an image imaged by the imaging unit, and
    the image data processing unit processes the image data so that the same area of image is played back even when an imaging direction changes in a specified direction.

11. The imaging device according to claim 1, wherein,
    the image data processing unit extracts a specified area of an image imaged by the imaging unit, and
    when an imaging direction changes in a specified direction, the image data processing unit changes the specified area in a direction opposite to the specified direction.

12. The imaging device according to claim 1, wherein,
    the image data processing unit extracts a specified area of an image imaged by the imaging unit, and
    when the specified area is located at an edge of the image imaged by the imaging unit, the image data processing unit changes the specified area upon end of a change in an imaging direction.

13. An information processing device that processes image data supplied from an imaging unit in a format in accordance with a displacement detected by a displacement detection unit configured to detect a spatial displacement,
    wherein the information processing device detects that a displacement or a rotation angle detected by the displacement detection unit is equal to or greater than a specified angle based on comparison of an output of the displacement detection unit with a threshold, and processes the image data so that at least some of images acquired during a period when the displacement detected by the displacement detection unit is equal to or greater than the specified angle are eliminated.

14. An operation method for an imaging device, comprising:
    generating image data via an imaging unit;
    detecting a spatial displacement via a displacement detection unit; and
    processing the image data supplied from the imaging unit via an image data processing unit in a format in accordance with the displacement detected by the displacement detection unit,
    wherein the image data processing unit detects that a displacement or a rotation angle detected by the displacement detection unit is equal to or greater than a specified angle based on comparison of an output of the displacement detection unit with a threshold, and processes the image data so that at least some of images acquired during a period when the displacement detected by the displacement detection unit is equal to or greater than the specified angle are eliminated.

15. A non-transitory computer-readable medium storing having stored thereon a program that causes a computer, upon execution by a processing device of a computer, to execute the process according to claim 14.

16. An imaging device, comprising:
an imaging means;
a displacement detection means for detecting a spatial displacement; and
an image data processing means for processing image data supplied from the imaging means in a format in accordance with the displacement detected by the displacement detection means,
wherein the image data processing means detects that a displacement or a rotation angle detected by the displacement detection means is equal to or greater than a specified angle based on comparison of an output of the displacement detection means with a threshold, and processes the image data so that at least some of images acquired during a period when the displacement detected by the displacement detection means is equal to or greater than the specified angle are eliminated.

17. An imaging device, comprising:
an imaging unit;
a displacement detection unit configured to detect a spatial displacement; and
an image data processing unit configured to process image data supplied from the imaging unit in a format in accordance with the spatial displacement detected by the displacement detection unit,
wherein the image data processing unit, upon a detection that a displacement angular velocity by the displacement detection unit is higher than a threshold, processes the image data i) so that a first portion of images, acquired by the imaging unit after the displacement detection of displacement angular velocity, are displayed at a delayed timing, and ii) so that each display interval of a second portion of the images acquired by the imaging unit after the displacement detection of displacement angular velocity is shortened.

18. An information processing device that processes image data supplied from an imaging unit in a format in accordance with a displacement detected by a displacement detection unit configured to detect a spatial displacement,
wherein the information processing device, upon a detection that a displacement angular velocity by the displacement detection unit is higher than a threshold, processes the image data i) so that a first portion of images acquired from the imaging unit after the displacement detection of displacement angular velocity are displayed at a delayed timing, and ii) so that each display interval of a second portion of the images acquired from the imaging unit after the displacement detection of displacement angular velocity is shortened.

19. An operation method for an imaging device, comprising:
generating image data via an imaging unit;
detecting a spatial displacement via a displacement detection unit; and
processing the image data supplied from the imaging unit via an image data processing unit in a format in accordance with the spatial displacement detected by the displacement detection unit,
wherein the image data processing unit, upon a detection that a displacement angular velocity by the displacement detection unit is higher than a threshold, processes the image data i) so that a first portion of images acquired by the imaging unit after the displacement detection of displacement angular velocity are displayed at a delayed timing, and al so that each display interval of a second portion of the images acquired by the imaging unit after the displacement detection of displacement angular velocity is shortened.

20. A non-transitory computer-readable medium having stored thereon a program that causes a computer, upon execution by a processing device of the computer, to execute the process according to claim 19.

21. An imaging device, comprising:
an imaging means;
a displacement detection means for detecting a spatial displacement; and
an image data processing means for processing image data supplied from the imaging means in a format in accordance with the spatial displacement detected by the displacement detection means,
wherein the image data processing means, upon a detection that a displacement angular velocity by the displacement detection means is higher than a threshold, processes the image data i) so that a first portion of images acquired by the imaging means after the displacement detection of the displacement angular velocity are displayed at a delayed timing, and ii) so that each display interval of a second portion of the images acquired by the imaging means after the displacement detection of displacement angular velocity is shortened.

* * * * *